(12) United States Patent
Nguyen

(10) Patent No.: US 8,843,152 B2
(45) Date of Patent: Sep. 23, 2014

(54) MEDIA GATEWAY PREFERENTIAL ROUTING CIRCUIT ALLOCATION TECHNIQUES IN UMA

(75) Inventor: Trinh Nguyen, Grapevine, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1445 days.

(21) Appl. No.: 12/079,977

(22) Filed: Mar. 31, 2008

(65) Prior Publication Data
US 2009/0245218 A1 Oct. 1, 2009

(51) Int. Cl.
*H04W 72/00* (2009.01)
*H04Q 3/66* (2006.01)

(52) U.S. Cl.
CPC ....... *H04Q 3/66* (2013.01); *H04Q 2213/13141* (2013.01); *H04Q 2213/13144* (2013.01); *H04Q 2213/13353* (2013.01); *H04Q 2213/13389* (2013.01); *H04Q 2213/13164* (2013.01); *H04Q 2213/13332* (2013.01); *H04Q 2213/13166* (2013.01); *H04Q 2213/13034* (2013.01); *H04Q 2213/13344* (2013.01); *H04Q 2213/13196* (2013.01); *H04Q 2213/13146* (2013.01); *H04Q 2213/13098* (2013.01); *H04Q 2213/13056* (2013.01)
USPC ........ 455/453; 455/450; 455/451; 455/452.1; 455/452.2; 455/454; 455/456.1

(58) Field of Classification Search
CPC ..... H04W 16/08; H04W 16/06; H04W 28/02; H04W 28/08; H04W 36/22
USPC ....................................................... 455/456.1
See application file for complete search history.

(56) References Cited

U.S. PATENT DOCUMENTS

| 5,406,620 A | 4/1995 | Pei | |
|---|---|---|---|
| 2006/0171298 A1* | 8/2006 | Vu | 370/216 |
| 2006/0223534 A1* | 10/2006 | Newberg et al. | 455/436 |
| 2007/0116018 A1* | 5/2007 | Doleh et al. | 370/401 |
| 2008/0280617 A1* | 11/2008 | Aguilar et al. | 455/445 |
| 2009/0068970 A1* | 3/2009 | Ahmed et al. | 455/161.1 |

FOREIGN PATENT DOCUMENTS

| EP | 1058447 A | 12/2000 |
|---|---|---|
| WO | WO02060193 A | 8/2002 |
| WO | WO 2005107198 A1 * | 11/2005 |
| WO | WO2007139641 A | 12/2007 |

* cited by examiner

*Primary Examiner* — Amancio Gonzalez
(74) *Attorney, Agent, or Firm* — RGIP LLC (57) ABSTRACT

The present invention provides for giving preference to a specific media gateway in the selection of the next circuit so that in a multi-media-gateway soft-switch where a call may take any of many possible paths, an outgoing circuit on the same media-gateway as the incoming circuit is preferably selected, so if one is available, the need for using more bearer ports on media gateways to bridge the two sides is eliminated. Instead of interconnection, the same facilities can be provisioned to the bearer interface between the soft-switch and the rest of the network. This invention maximizes the bearer capacity of a distributed media gateway for external network access.

15 Claims, 8 Drawing Sheets

MEDIA GATEWAY PREFERENTIAL ROUTING CIRCUIT ALLOCATION TECHNIQUES IN UMA

FIELD OF THE INVENTION

This invention relates to the monitoring and provisioning of calls through one or more call-servers such that call circuits are preferentially routed. The preferential routing serves to balance the throughput of the call-server queues so as to balance the call load and maximize the utilization of the equipment.

BACKGROUND OF THE INVENTION

Providers of wireless telephone services must provide for provisioning of access circuits for routing incoming and outgoing calls. Optimizing the throughput for calls through a routing device such as a Wireless Soft Switch (WSS) requires implementing circuit selection algorithms that will maximize circuit and trunk usage and minimize circuit connection time. Existing solutions for such optimization involve standard circuit selection algorithms such as Top-Down selection, Bottom-Up selection, Most-Idle selection, and Least-Idle selection.

These solutions provide for some optimization of circuit selection, however, they do not consider the usage of multiple media gateways. Not considering media-gateways in the circuit selection algorithms leads to rigid, inflexible, and unbalanced loading of resources among different media gateways. This can include the unbalanced loading of Internet Phone (IP) for Unlicensed Mobile Access (UMA) resources.

A system and method is needed whereby the usage of the bandwidth of a media gateway may be optimized for maximum throughput in call handling. In addition, balancing the load of call handling across multiple media gateways would maximize the system capacity within the network.

SUMMARY OF THE INVENTION

Media Gateway Preferential Routing is a simple concept of giving preference to a specific media gateway in the selection of the next circuit so that in a multi-media-gateway soft-switch where a call may take any of many possible paths, an outgoing circuit on the same media-gateway as the incoming circuit is preferably selected, so if one is available, the need for using more bearer ports on media gateways to bridge the two sides is eliminated. Instead of interconnection, the same facilities can be provisioned to the bearer interface between the soft-switch and the rest of the network.

The basic idea of this solution is to monitor the usage of each media gateway's bandwidth for call handling with each call. It is to select the most idle media gateway for an incoming call when the WSS handles incoming allocation. To recognize the source media gateway which processes an incoming call in other cases, and to attempt to select the same media gateway to handle the outgoing side of the same call, all in such a way to minimize the usage of valuable ports for internal interconnections. This solution is different than existing solutions in that the WSS also intelligently cuts down the interconnections of the media gateways, which in turn allows operators to dedicate a higher percentage of the same number of media gateway resources to network access as opposed to internal interconnections, in effect maximizing the system capacity within the network.

In an additional exemplary embodiment, when applied to UMA, the Preferential Routing principles described above need to be realized and extended as follows. Within the network there are multiple media gateways distributed in potentially different cities but are controlled by the same call server. A UMA trunk-group (dark, solid lines) is typically provisioned by containing IP channels from all media gateways and may serve multiple service areas, such as, for example, multiple cities.

The main advantage of the new solution is to enable an integrated WSS/UNC to scale up as traffic demands by adding more media-gateways and have the call-server automatically adjust its circuit selection algorithms to pool or distribute calls among all media gateways. This capability makes possible different media gateway configurations yet requires little manual intervention from network engineering.

DETAILED DESCRIPTION OF THE INVENTION

In an exemplary embodiment, preferential treatment is applied after the call has come into the switch, an outgoing route has been determined based on configuration and routing rules, and the call is ready to go out. The selection of the incoming circuit is already performed by the previous switch. Only the outgoing circuit and trunk group the call uses to exit the switch is decided by the current switch. The physical bearer facilities that carry calls in and out are grouped into logical "trunk-groups", each of which are part of a pre-configured route. The Preferential Routing Technique requires each trunk-group be composed of bearer facilities from the media-gateways controlled by the current soft-switch. The distribution of circuits in the same trunk-group should be equal across all media-gateways to be statistically prepared for all traffic patterns over a long period.

Figure 1:
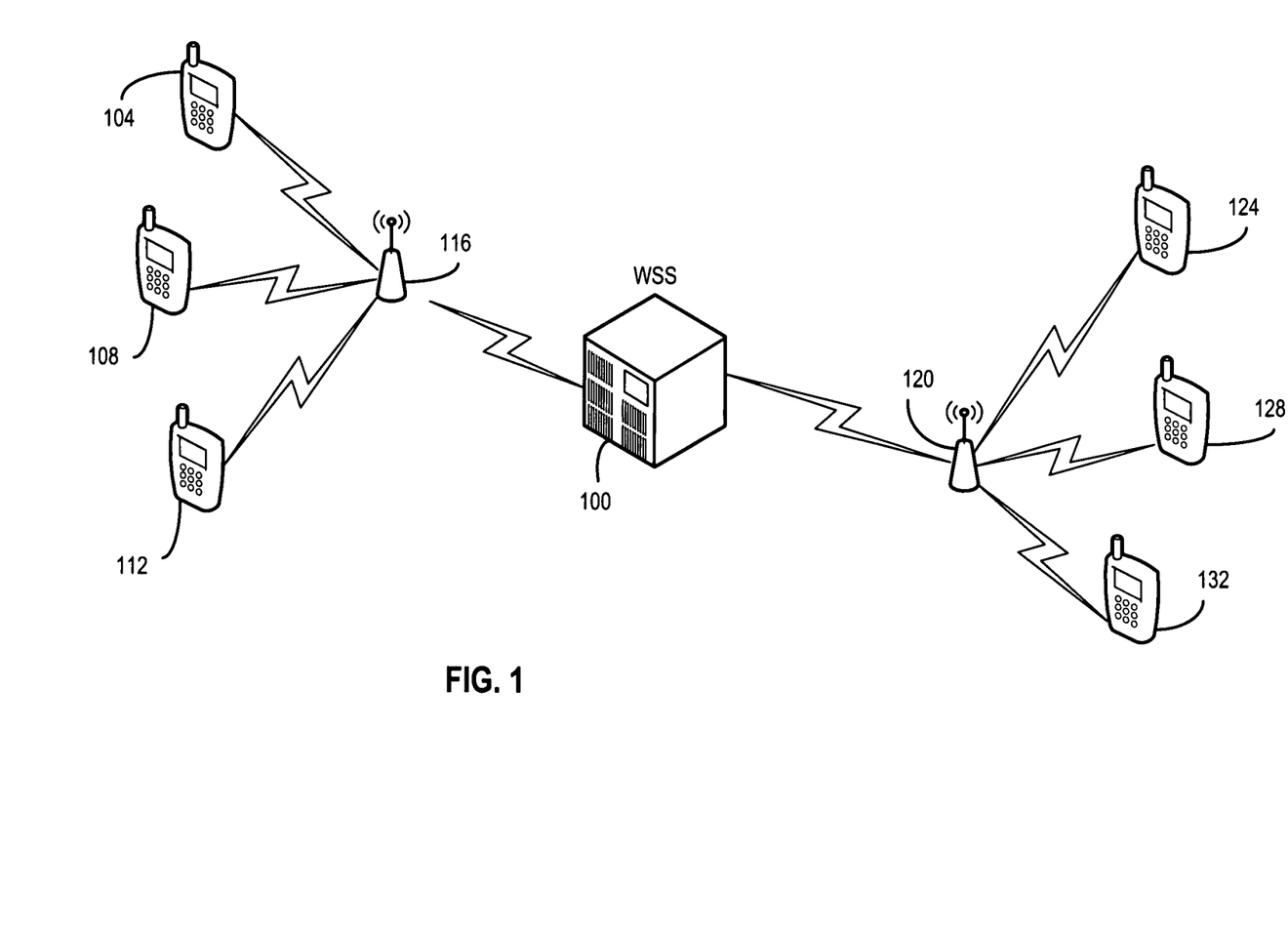
FIG. 1 is a diagram of system connectivity consistent with certain embodiments of the present invention.

Regarding FIG. 1, this figure illustrates an integrated communications network containing a Wireless Soft Switch (WSS) 100 as the routing call-server. Requests for service, to complete calls from one subscriber to another, are received from wireless devices (such as 104, for example) at an aggregation point 116. Service requests are aggregated and transmitted to a call-server such as an integrated WSS/UNC call-server 100. Calls are connected from incoming circuits to outgoing circuits through the trunk and circuit sets provisioned within the call-server 100. Calls are properly routed within the call-server 100 and passed to a wireless transmission point 120 to reach their final destination of another wireless subscriber (such as 124, for example).

Figure 2:
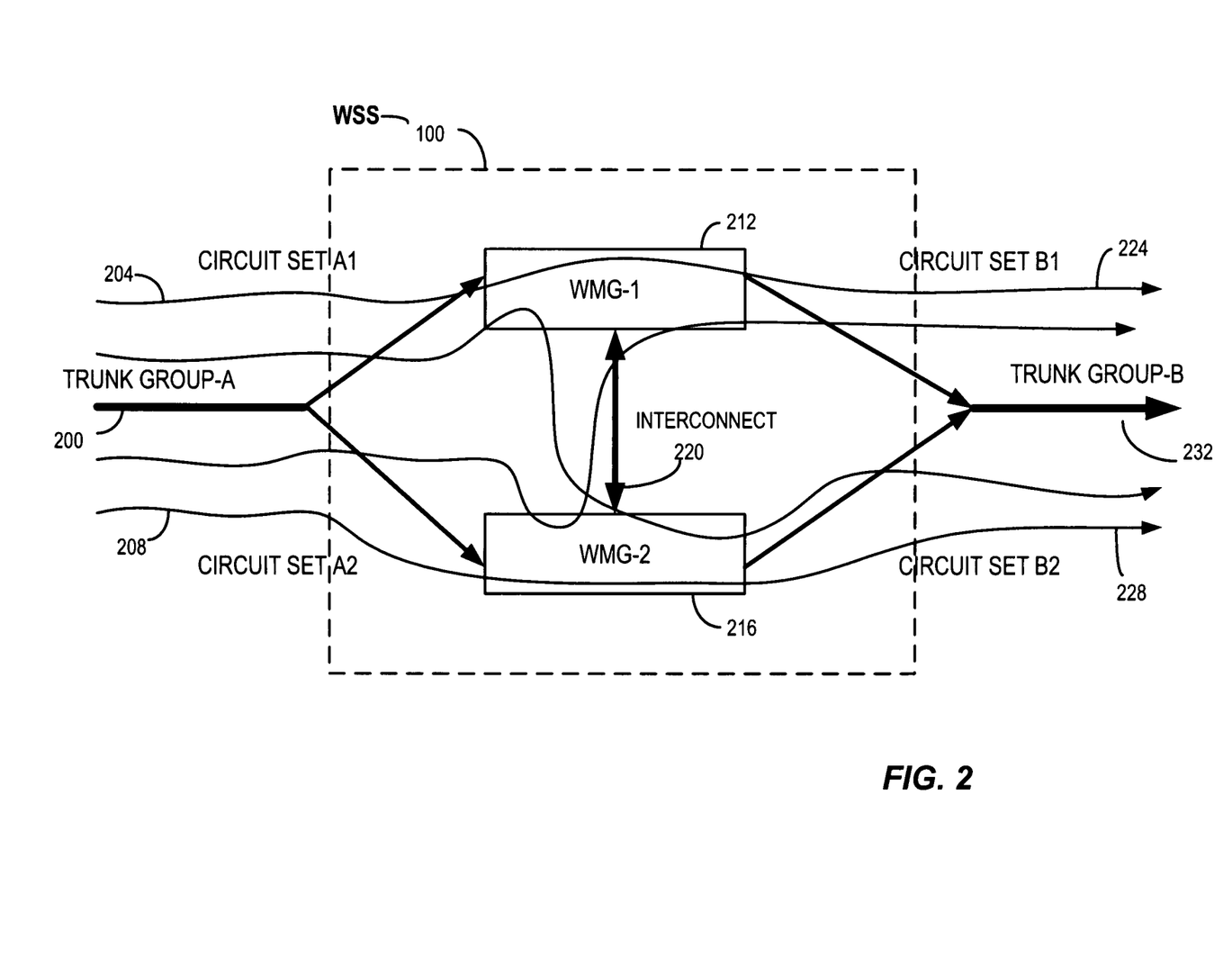
FIG. 2 is a diagram of traffic pathways within the WSS consistent with certain embodiments of the present invention.

Regarding FIG. 2, this figure presents an exemplary embodiment for establishing calls through an integrated WSS/UNC call-server 100 with an interconnect provisioned between a first Wireless Media Gateway (WMG-1)212 and a second Wireless Media Gateway (WMG-2) 216. In this embodiment, circuit sets A1 204 and A2 208 are part of Trunk Group-A 200, and circuit sets B1 224 and B2 228 are part of Trunk Group-B 232.

In this exemplary embodiment traffic always comes into a 2-media gateway WSS 100 through one trunk-group 200 and out another 232. FIG. 2 indicates four possible different paths calls can take when they are routed through the WSS call-server 100. The paths from circuit-set A1 204 to circuit-set B1 224 and from circuit-set A2 208 to circuit-set B2 228 are always preferred as they do not require allocation of interconnect resources. It is a prerequisite that both logical trunk-group A 200 and logical trunk-group B 232 must be provisioned to include circuit sets on both WMG-1 212 and WMG-2 216.

Most of the time, the media gateway that handles the incoming connection request is dictated by the previous network entity, so the WSS 100 must be able, assuming the operator having followed the provisioning prerequisite, to select the same media gateway to handle the outgoing side. For example, in the preferred routing, if an incoming request arrives on circuit-set A1 204 and WMG-1 is provisioned for circuit-set A1 204 and circuit-set B1 224 the preferred routing to maximize call throughput and minimize the connection time for the request is to route the call from circuit-set A1 204 to circuit-set B1 224 through WMG-1 212. Whenever the WSS 100 also selects the incoming WMG, it must also be able to do so in a way to increase the success rate of getting a circuit on the same media gateway on the outgoing side as well.

Figure 3:
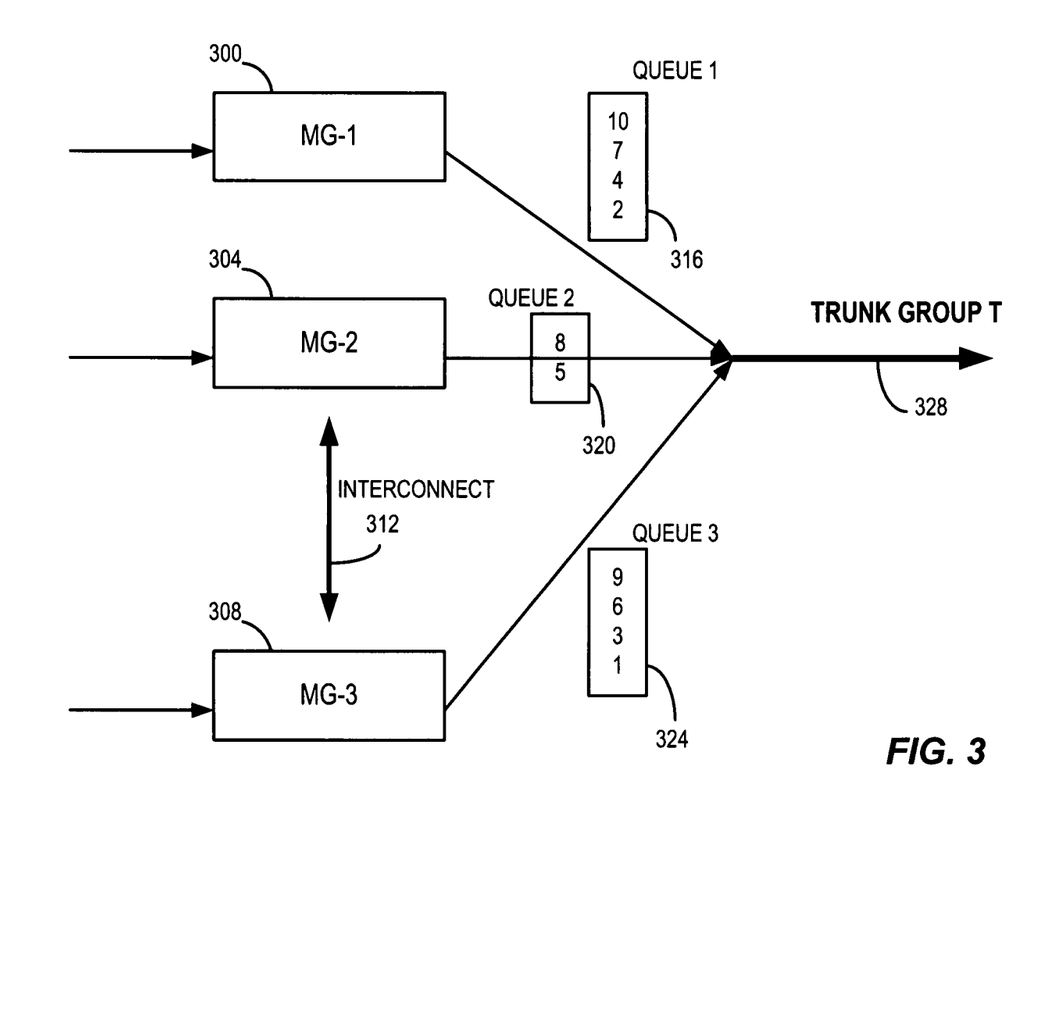
FIG. 3 is a diagram of interconnect selection patterns consistent with certain embodiments of the present invention.

Regarding FIG. 3, segregation of idle circuits based on media gateways is performed before the allocation-strategy for a trunk-group, such as trunk-group T 328, is applied. In effect, each media gateway has its own queue sorted and filled with its own circuits in the trunk-group 328. These gateway specific queues (316,320,324) are in addition to the existing "master queue" for trunk-group T 328. For example, in this exemplary embodiment there are 3 different media gateways (300,304,308) with circuits inside trunk-group T 328, giving rise to 3 separate queues (316,320,324), each containing circuits in the DESCENDING-CIRCUIT-ID order based on configuration of trunk-group T 328.

A check for an interconnect resource only goes so far as making sure that an interconnect is provisioned, and does not try to determine if that interconnect resource still has enough bandwidth to perform the interconnection. This is intentionally so for two reasons: First, interconnect resource consists of different types, one of which is ATM, of which the bandwidth is not found out until the actual gateway connection is attempted. Second, the actual circuit allocation from the interconnect resource may be performed in a separate transaction. The status of bandwidth may change quickly from the time the trunk-group 328 is searched till the time the interconnection is allocated.

Which of the three queues yields the next outgoing circuit depends on where the call comes in. Suppose the next 6 calls come in at lists MG-1 300, MG-2 304, MG-3 308, MG-1 300, MG-2 304, MG-3 308, then the order of outgoing circuits selected from trunk-group T 328 will be 10, 8, 9, 7, 5, 6 as provided by the lookup algorithm.

Figure 4:
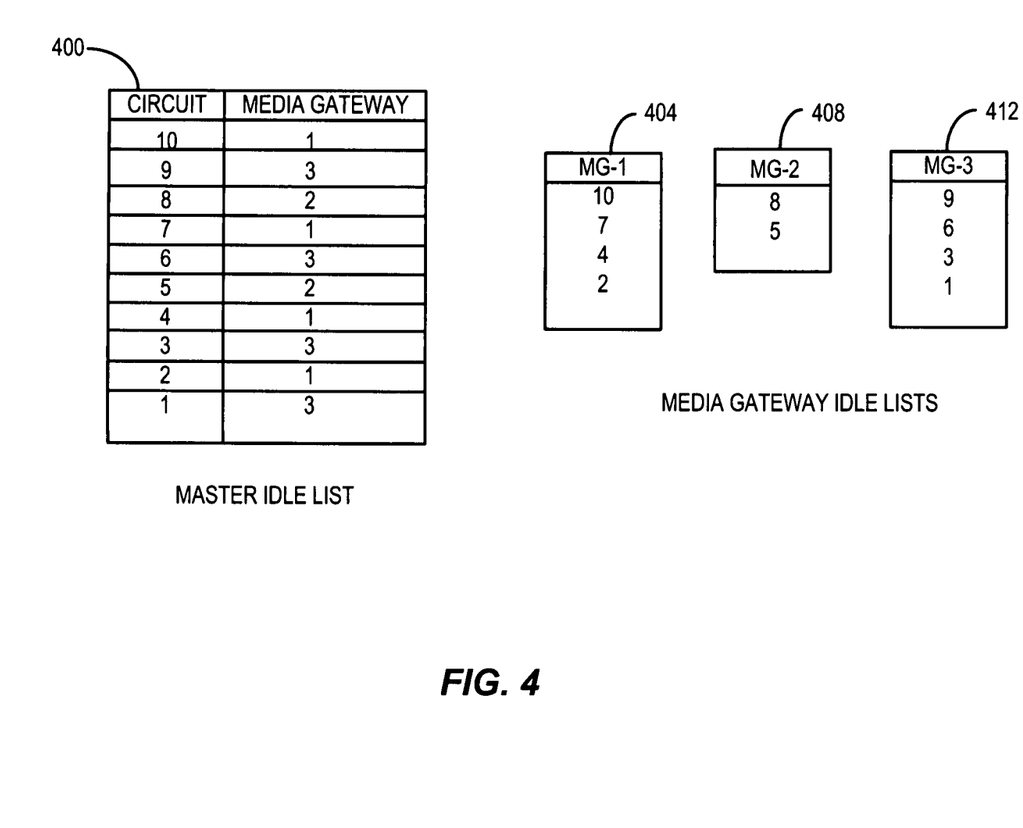
FIG. 4 is a diagram of master and gateway idle circuit lists consistent with certain embodiments of the present invention.

When a media gateway's circuit queue is empty, the circuit to be retrieved is from the top of the master queue 400 if this circuit is interconnected to that media gateway. For example, the seventh call comes in at MG-2 304, but its queue is now empty, then circuit 3 of MG-3 308 from the master queue would be selected, because unlike circuit 4 of MG-1 300, it does have an interconnect path between MG-3 308 and WMG-2 304.

If the second search still did not yield a suitable circuit, the Circuit Allocator will cycle through the remaining MG queues in the same direction, thereby dividing the load statistically equally among the available media gateways over time, assuming the incoming calls are already randomly distributed to all media gateways.

Regarding FIG. 4, this figure presents an exemplary embodiment of the Preferential Routing circuit allocation tables. At the core, routing consists of keeping a separate idle-circuit list (404,408,412) for each media gateway and a master list 400 for the whole trunk-group 328. The preferential routing algorithm keeps a constant inventory of available interconnect facilities between any two media-gateways. Together, the idle-circuit lists maintain two kinds of selection order: one that honors the operator's choice of allocation-strategy, and one broken down according to media-gateway using the same operator's allocation-strategy. This routing strategy enables a Circuit Allocator to have instantaneous access to the idle circuits at different times in the algorithm. When a circuit becomes idle, it is added to both the sorted master list 400 and a sorted media-gateway specific list (404, 408,412). When the Circuit Allocator looks for the next available circuit, the media-gateway lists (404,408,412) are checked first, then the master list 400.

Figure 5:
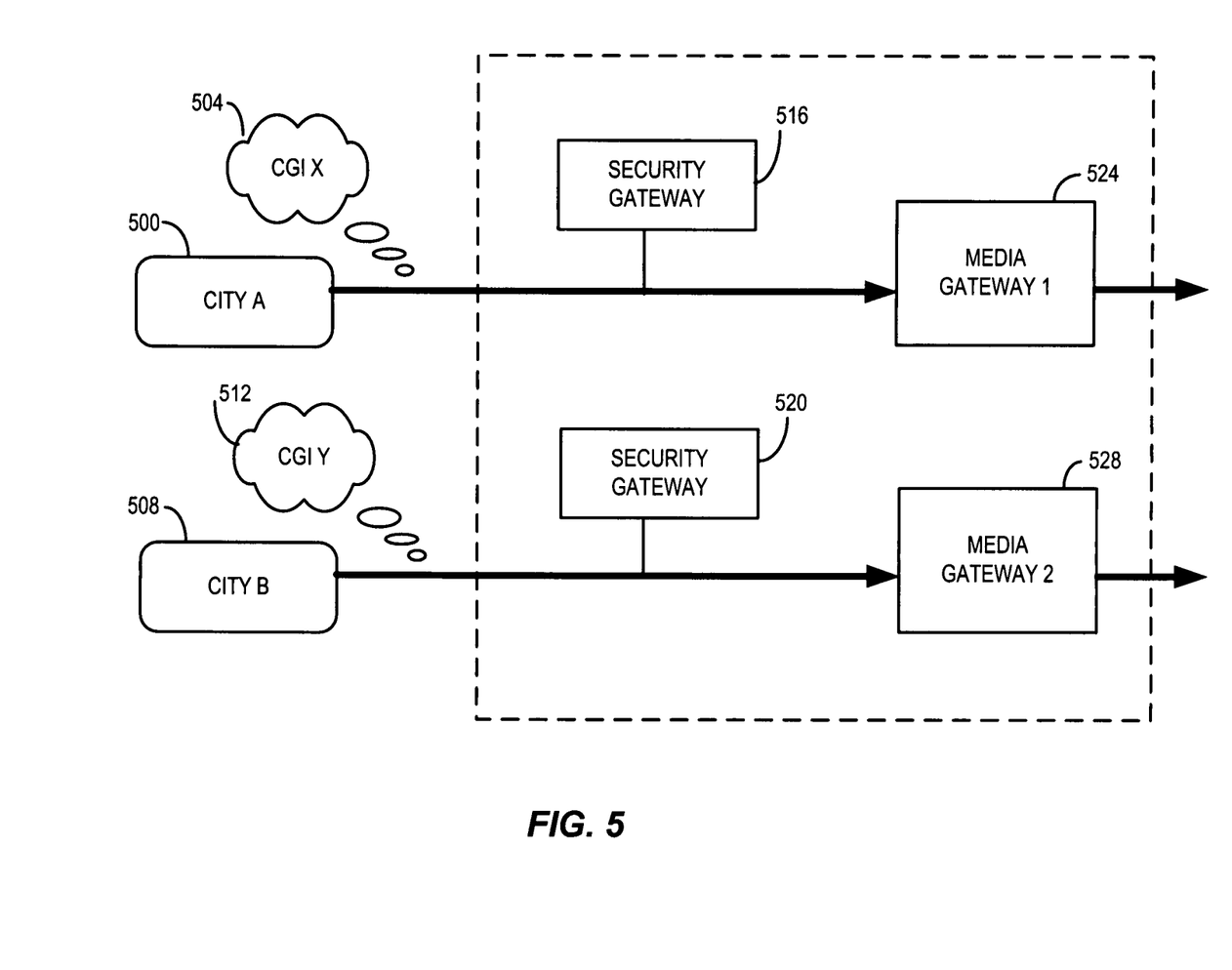
FIG. 5 is a diagram of facilitating preferential routing for a UMA trunk group consistent with certain embodiments of the present invention.

Regarding FIG. 5, when applied to Unlicensed Mobile Access (UMA), the preferential routing principles need to be realized and extended. Within the network there are multiple media gateways distributed in potentially different cities but are controlled by the same call server. This figure shows how UMA trunk-groups are typically provisioned.

In an exemplary embodiment, a UMA trunk-group is made to contain IP channels from all media gateways controlled by the call-server 100. Each media gateway (524,528) needs to be provisioned and associated with a location identifier such as CGI or an UNC Security Gateway (516, for example). When an IP channel is allocated for an incoming UMA call from City A 500, through UMA signaling, either the CGI 504 or the UNC Security Gateway 516, or both, may be identified. This leads to identification of the closest media-gateway to where the call originated by the call-server 100. The rest of the circuit allocation for this call half follows the Incoming Preferential Routing as described in FIG. 7.

When an IP channel is allocated for an outgoing UMA call, the media gateway identifier obtained from the incoming side becomes the main driver. The rest of the circuit allocation for this call half follows the Outgoing Preferential Routing as described in FIG. 6.

Figure 6:
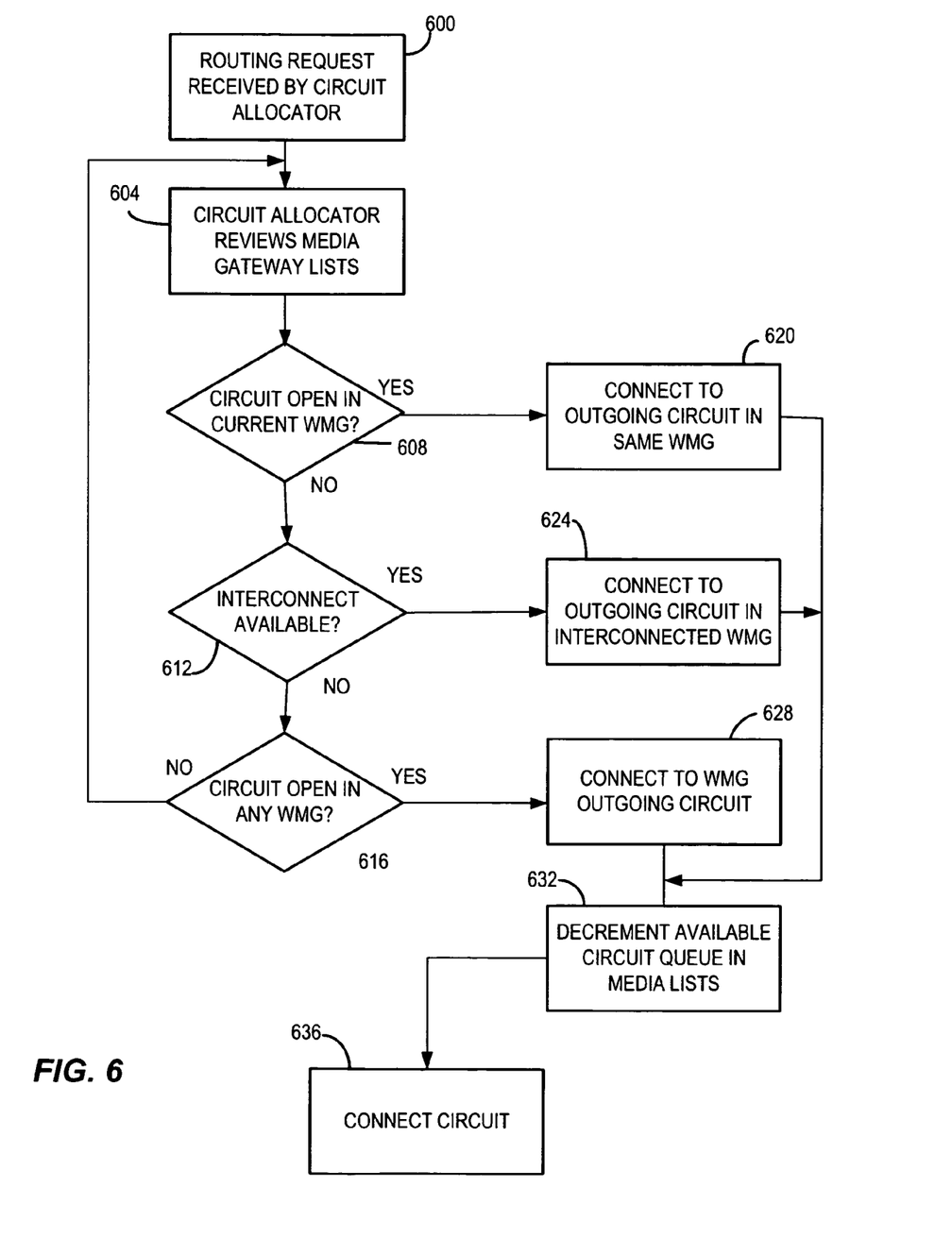
FIG. 6 is a flow diagram of outgoing preferential routing flow consistent with certain embodiments of the present invention.

Regarding FIG. 6, in an exemplary embodiment Outgoing Preferential Routing provides circuit allocation when the incoming circuit-set has already been determined. The Circuit Allocator module receives a routing request 600 and reviews the media gateway lists (404,408,412) and master gateway list 400 to determine availability of outgoing circuit-sets within the MG 604. If a circuit-set is available in the current MG 608 the call is routed to an outgoing circuit-set within the same MG 620. If there is no outgoing circuit-set available within the same MG, the Circuit Allocator reviews the interconnection table to determine if there are any other MGs provisioned with an interconnection to the current MG 612. If there is an interconnection with a second MG available, the call is routed to an outgoing circuit-set within the interconnected MG 624. If there is not circuit available in the current MG, and there is no interconnection to a second MG available, the Circuit Allocator reviews the master list 400 for any circuit available in any MG within the call-server 616. If there is a circuit-set available in another MG, the call is routed to an outgoing circuit-set in any available MG 628. Once the Circuit Allocator has routed a call through an outgoing circuit-set, the Circuit Allocator causes the MG list and the master list to be decremented by the circuit-set thus allocated 632. If no circuits are currently available in any of the MGs within the call-server, the Circuit Allocator continues to scan the MG lists and the master list until an outgoing circuit-set is released and is repopulated within one of the lists.

Figure 7:
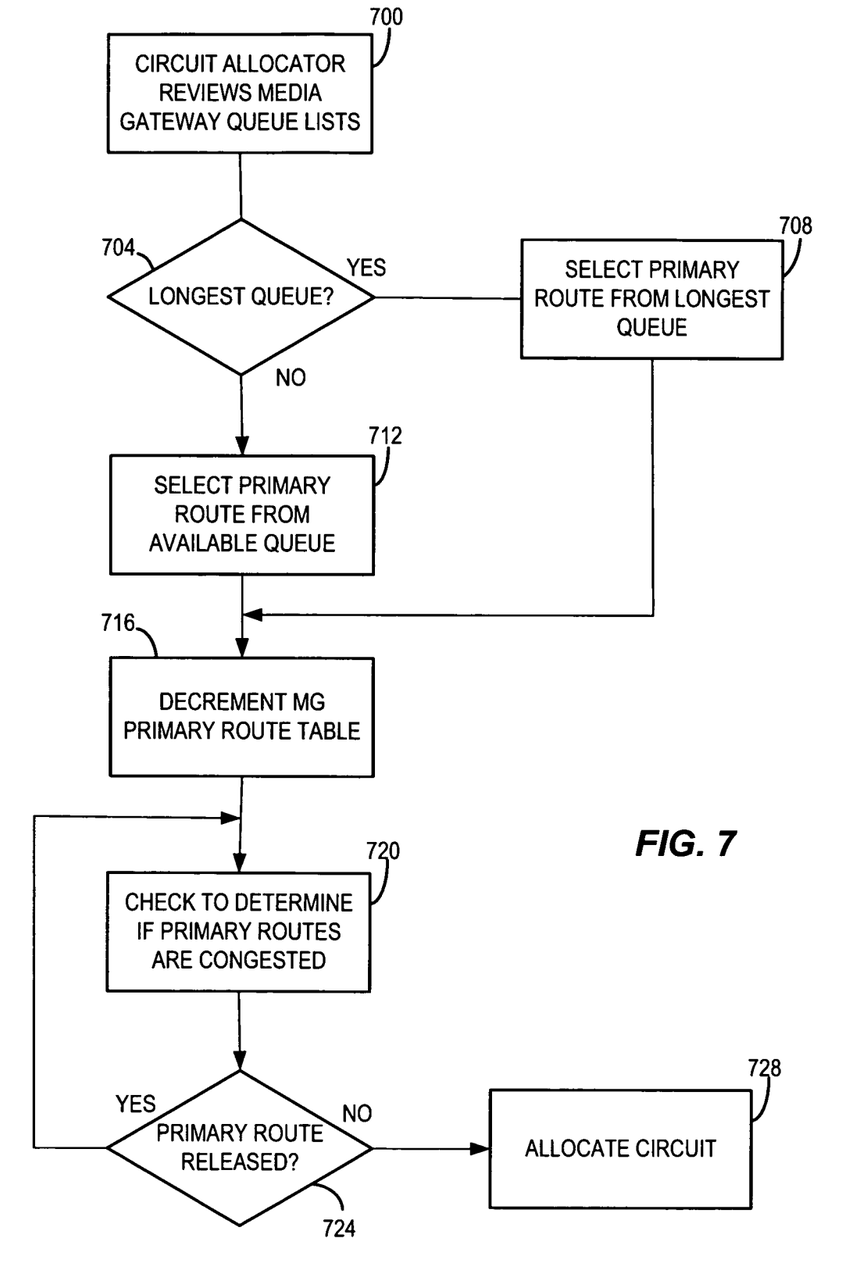
FIG. 7 is a flow diagram of incoming preferential routing flow consistent with certain embodiments of the present invention.

Regarding FIG. 7, in an exemplary embodiment for Incoming Preferential Routing, such as when the soft-switch acts as a circuit-master towards a Base Station or as an integrated WSS/UNC, the soft-switch itself also allocates incoming circuits. Because at the time of allocation, the call has not come into any media-gateway, there is no clear, established preference. In this scenario, the algorithm used by the Circuit Allocator is different.

For Incoming Preferential Routing, the Circuit Allocator maintains a map of primary routes 700, which are defined as the routes most likely to carry traffic according to user configurations (as opposed to alternate or "backup" routes). At the system level, each media-gateway has a total of available primary routes that may go up or down as calls go in and out of the system. For example, at time t1, the three media-gateways in a soft-switch within the WSS have these primary-route totals: 10 (MG1), 12 (MG2), 9 (MG3). If an incoming circuit is to be selected, the best chance for the Circuit Allocator to also succeed in selecting an outgoing circuit on the same media-gateway using the Outgoing Preferential Routing treatment is to select a MG2 incoming circuit, because it has more options/routes still available than the others and thus has the longest queue 704. The primary route is selected from the MG with the longest queue 708. If all queues are equal in length, or just one queue has idle circuits, the circuit will be allocated from the first available queue 712. After each circuit selection, the queues are decremented to reflect the current state of circuit availability 716. After each circuit selection, the primary-routes are checked to see if they become congested 720, which would decrease the primary-route totals for the next incoming selection. When a circuit is released 728, the primary-routes are checked again to see they are no longer congested, which would increase the primary-route totals. Circuits are thus allocated 728 from the longest queues first, to minimize congestion.

Figure 8:
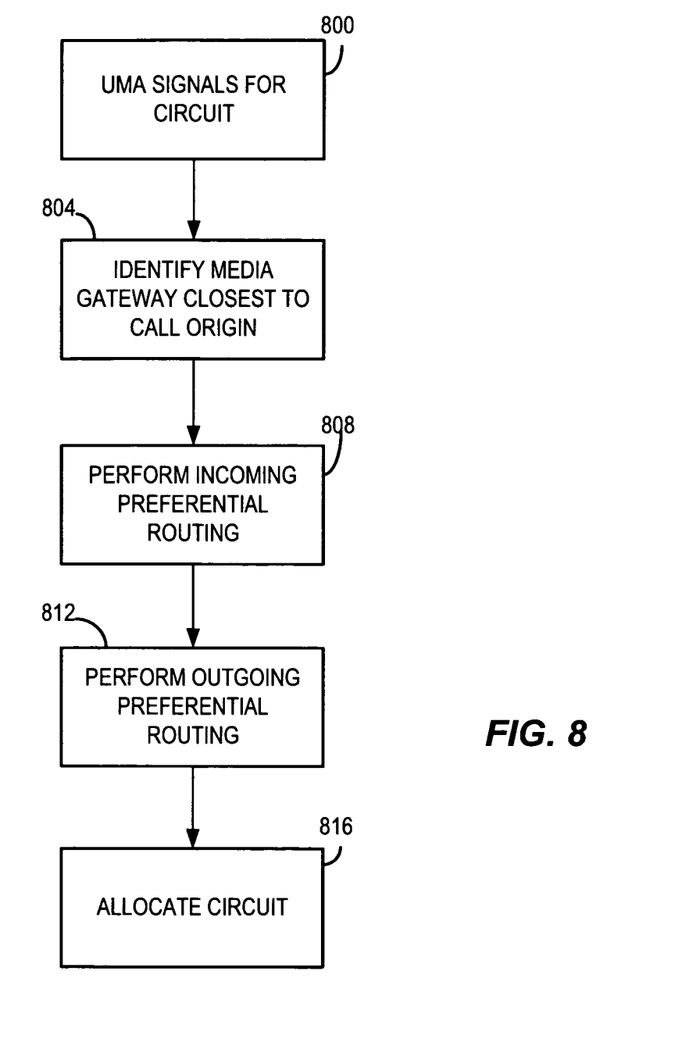
FIG. 8 is a diagram of Unlicensed Mobile Access routing flow consistent with certain embodiments of the present invention.

Regarding FIG. 8, in an exemplary embodiment a UMA subscriber may be in one of a plurality of physical locations. The UMA signals for a circuit 800 and the signal is received at the WSS call-server 100. The media gateway is provisioned with a location identifier such that it is associated with a particular location or set of locations that is associated with a CGI or UNC Security Gateway. The location identifier provides the location of the UMA subscriber and allows the call-server to identify the media gateway that is closest to the call origin 804. The WSS call-server 100 is then active to perform incoming circuit selection through Incoming Preferential Routing (see FIG. 7) 808. Once an incoming circuit-set has been determined, the WSS call-server 100 is then active to perform outgoing circuit selection through Outgoing Preferential Routing (see FIG. 6) 812. With both incoming and outgoing circuit-sets determined, the WSS call-server 100 is then active to complete circuit allocation and the UMA subscriber is connected.

While certain illustrative embodiments have been described, it is evident that many alternatives, modifications, permutations and variations will become apparent to those skilled in the art in light of the foregoing description.

What is claimed is:

1. A method to maximize external network access capacity in an integrated call-server comprising:
    receiving a request for a circuit allocation at a first wireless media gateway;
    reviewing the request to determine an incoming logical trunk-group for a call incoming to said integrated call-server;
    reviewing a plurality of wireless media gateway lists associated with a corresponding plurality of wireless media gateways to determine call circuit availability for the plurality of wireless media gateways in said integrated call-server, wherein each of the plurality of wireless media gateways is associated with a location identifier associated with a network security gateway;
    connecting the incoming call to an outgoing logical trunk-group provisioned in the same wireless media gateway as the incoming logical trunk-group, if a call circuit is available;
    if no call circuit is available in the same wireless media gateway, then reviewing an interconnection table to determine if there are any other wireless media gateways currently provisioned with an interconnection to the first wireless media gateway;
    determining the availability of an interconnection between said first wireless media gateway and a second wireless media gateway within said integrated call-server responsive to said reviewing of the interconnection table;
    connecting the incoming call to an outgoing logical trunk-group provisioned in said second wireless media gateway; and
    wherein said connecting divides the load statistically equally among the available media gateways to minimize the time and cost for connection of a call from an incoming logical trunk-group to an outgoing logical trunk-group for all calls incoming to said integrated call-server.

2. A method according to claim 1, further comprising:
    said call-server is an integrated Wireless Soft Switch (WSS)/Unlicensed Mobile Access (UMA) Network Controller (UNC) call-server.

3. A method as in claim 1, further comprising:
    wherein said circuit allocation request is received and processed by said WSS/UNC call server, which routes the incoming call to the outgoing logical trunk-group responsive to the circuit allocation request.

4. A method according to claim 1, further comprising:
    wherein the call connection from said incoming logical trunk-group to said outgoing logical trunk-group is a connection between any two wireless media gateways when interconnected wireless media gateways are unavailable.

5. A method according to claim 4, further comprising:
    wherein each of said incoming and outgoing trunk-groups comprises a plurality of circuit-sets.

6. A method as in claim 1, further comprising:
    maintaining a master idle list for all circuit-sets within said call-server;
    maintaining separate idle lists for each wireless media gateway;
    wherein said lists are updated for each trigger event.

7. A method according to claim 6, further comprising:
A trigger event is the connection of a circuit-set to complete a call, or the release of a circuit-set when a call is complete.

8. A non-transitory computer readable storage medium configured to store instructions that when executed cause a processor to perform optimizing external network access connectivity in an integrated call-server, the processor being further configured to perform:
   receiving a request for a circuit allocation at a first wireless media gateway;
   reviewing the request to determine an incoming logical circuit-set for a call incoming to said integrated call-server;
   reviewing a plurality of wireless media gateway lists corresponding to a plurality of wireless media gateways to determine circuit-set availability for the plurality of wireless media gateways in said integrated call-server, wherein each of the plurality of wireless media gateways is associated with a location identifier associated with a network security gateway;
   identifying which of the plurality of wireless media gateway lists comprises a longest queue of available circuit-sets and interconnection circuits between any of said plurality of wireless media gateways;
   connecting the incoming call to an outgoing logical circuit-set selected from the identified wireless media gateway list with the largest number of available circuit-sets; and
   wherein said connecting reduces the time and cost for connection of a call from an incoming logical circuit-set to an outgoing logical circuit-set for all calls incoming to said integrated call-server.

9. A non-transitory computer readable storage medium according to claim 8, wherein the integrated call-server is an integrated Wireless Soft Switch (WSS)/Unlicensed Mobile Access (UMA) Network Controller (UNC) call-server.

10. A non-transitory computer readable storage medium according to claim 8, wherein said circuit allocation request is received and processed by a Circuit Allocator module within said WSS/UNC call server.

11. A non-transitory computer readable storage medium according to claim 8, wherein the processor is further configured to perform:
   maintaining a master idle list for all circuit-sets within said call-server; and
   maintaining separate idle lists for each wireless media gateway;
   wherein said lists are updated for each trigger event.

12. A non-transitory computer readable storage medium according to claim 11, wherein a trigger event is the connection of a circuit-set to complete a call, or the release of a circuit-set when a call is complete.

13. A non-transitory computer readable storage medium according to claim 8, further comprising:
   performing a check to determine if call connection routes are congested by call connection activities.

14. A system for maximizing external network access capacity in an integrated call-server comprising:
   a means for detecting signals for service from authorized devices;
   means for identifying a wireless media gateway geographically closest to a signal for service;
   means for performing incoming preferential routing within said integrated call-server by selecting a primary route from a list associated with a wireless media gateway among a plurality of lists associated with a corresponding plurality of wireless media gateways, the selected list comprising a longest queue of available circuit-sets as compared to the plurality of lists, wherein each of the plurality or wireless media gateways is associated with a location identifier associated with a network security gateway;
   means for performing outgoing preferential routing within said integrated call-server by preferential selection of a wireless media gateway comprising incoming and outgoing circuit-sets within the same wireless media gateway, or preferential selection of wireless media gateways that are provisioned with an interconnect between two different wireless media gateways; and
   means for circuit allocation and connection to complete service for said authorized devices.

15. A system according to claim 14, further comprising:
   means for adding more wireless media gateways to said call-server as service requests increase beyond the capacity of an existing group of wireless media gateways.

* * * * *